United States Patent
Song et al.

(10) Patent No.: US 9,889,526 B2
(45) Date of Patent: Feb. 13, 2018

(54) LASER WELDING METHOD FOR WELDING DISSIMILAR METAL PLATES

(71) Applicant: SUNGWOO HITECH CO., LTD., Busan (KR)

(72) Inventors: Mun Jong Song, Yangsan (KR); Mun Yong Lee, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 86 days.

(21) Appl. No.: 14/937,931

(22) Filed: Nov. 11, 2015

(65) Prior Publication Data
US 2017/0001262 A1 Jan. 5, 2017

(30) Foreign Application Priority Data
Jul. 3, 2015 (KR) .......................... 10-2015-0095561

(51) Int. Cl.
| B23K 26/00 | (2014.01) |
| B23K 26/323 | (2014.01) |
| B23K 26/21 | (2014.01) |
| B23K 26/0622 | (2014.01) |
| B23K 103/20 | (2006.01) |

(52) U.S. Cl.
CPC ........ B23K 26/323 (2015.10); B23K 26/0622 (2015.10); B23K 26/21 (2015.10); B23K 2203/20 (2013.01)

(58) Field of Classification Search
CPC .. B23K 26/323; B23K 26/0622; B23K 26/21; B23K 2203/20; B23K 26/24; B23K 26/244; B23K 26/26
USPC .......................... 219/121.64, 121.63, 121.85
See application file for complete search history.

(56) References Cited

U.S. PATENT DOCUMENTS

| 5,096,518 A | * | 3/1992 | Fujikawa | B22F 3/1258 156/89.28 |
| 5,603,853 A | * | 2/1997 | Mombo-Caristan | B23K 15/006 219/121.14 |
| 6,291,792 B1 | * | 9/2001 | Fussnegger | B23K 11/20 219/118 |
| 7,935,908 B2 | * | 5/2011 | Nakagawa | B23K 15/0093 219/121.12 |
| 2006/0278618 A1 | * | 12/2006 | Forrest | B23K 26/0604 219/121.64 |

(Continued)

FOREIGN PATENT DOCUMENTS

| CN | 1978119 | 6/2007 |
| CN | 101905379 | 12/2010 |

(Continued)

*Primary Examiner* — Mark Paschall
(74) *Attorney, Agent, or Firm* — Lex IP Meister, PLLC

(57) ABSTRACT

The present invention relates to a joining method, and more specifically relates to a method for joining different kinds of plates that joins at least two plate members of which materials thereof are different from each other through laser welding. For this, a method for joining different kinds of plates according to an exemplary embodiment of the present invention may include disposing a first plate and a second plate, materials of which are different from each other, such that they are overlapped with each other, and joining the first plate and the second plate by irradiating a laser beam at a predetermined inclination angle and in a regular pattern onto the overlapped portion of the two plates.

10 Claims, 4 Drawing Sheets

(56) References Cited

U.S. PATENT DOCUMENTS

| | | | | |
|---|---|---|---|---|
| 2007/0045251 A1* | 3/2007 | Franchet | .............. | B23K 20/021 |
| | | | | 219/121.64 |
| 2009/0134131 A1* | 5/2009 | Lee | .................... | B23K 26/0084 |
| | | | | 219/121.64 |
| 2015/0145241 A1* | 5/2015 | Asami | ..................... | F16L 13/02 |
| | | | | 285/288.1 |
| 2016/0001403 A1* | 1/2016 | Matsumoto | ............ | B23K 9/232 |
| | | | | 219/137 R |
| 2016/0297020 A1* | 10/2016 | Kaitoku | ............... | B23K 1/0056 |

FOREIGN PATENT DOCUMENTS

| | | |
|---|---|---|
| CN | 102126084 | 7/2011 |
| CN | 102407404 | 4/2012 |
| DE | 102013015710 | 7/2014 |
| DE | 102015001151 | 7/2015 |
| JP | 2006-035285 | 2/2006 |
| JP | 2006-320954 | 11/2006 |
| JP | 2007-090397 | 4/2007 |
| JP | 2007-136489 | 6/2007 |
| KR | 10-2013-0052323 | 5/2013 |
| KR | 10-2015-0073805 | 7/2015 |

* cited by examiner

LASER WELDING METHOD FOR WELDING DISSIMILAR METAL PLATES

CROSS-REFERENCE TO RELATED APPLICATION

This application claims priority to and the benefit of Korean Patent Application No. 10-2015-0095561 filed in the Korean Intellectual Property Office on Jul. 3, 2015, the entire contents of which are incorporated herein by reference.

BACKGROUND OF THE INVENTION (a) Field of the Invention

The present invention relates to a joining method, and more specifically, relates to a method for joining different kinds of plates that joins at least two plate members of which materials thereof are different from each other through laser welding.

(b) Description of the Related Art

Recently, demands for fuel consumption enhancement of a vehicle have been increasing, and thus aluminum, magnesium, and composite materials are being widely applied to vehicle body components instead of steel that was used for the sake of high strength and light body weight.

Because it is difficult to join different kinds of lightweight materials due to high electricity/heat conduction rates and excessive contamination of a welding electrode, mechanical joining methods such as a self-piercing rivet or clinching have been used. However, the mechanical joining method is expensive and is difficult, and the joining quality thereof is rough compared with a high level of welding.

When steel and light weight materials are used for a vehicle body, there is no adequate method except for the mechanical method, and production efficiency is deteriorated because a production line is separately prepared for joining of materials of different kinds, which is limited to a few parts of a vehicle body.

The description of the related art is for comprehension of a background of the present invention and may include contents other than the conventional art that is already known to a person of common skill in the art.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for joining different kinds of plates having advantages of being able to join steel and aluminum that are different material through laser welding.

Further, an exemplary embodiment of the present invention provides a method for joining different kinds of plates in which a laser beam is irradiated as a pulse wave type with a predetermined inclination angle so as to join different kinds of plates.

A method for joining different kinds of plates according to an exemplary embodiment of the present invention may include disposing a first plate and a second plate, materials of which are different from each other, such that they are overlapped with each other, and joining the first plate and the second plate by irradiating a laser beam at a predetermine inclination angle and in a regular pattern onto the overlapped portion of the two plates.

The first plate may be made of aluminum, and the first plate may be disposed on the second plate and may be made of steel of which a melting point thereof is higher than that of the first plate.

The laser beam may be outputted as a regular pulse wave.

A welding pool of the second plate may be charged in a key hole formed in the first plate between the first plate and the second plate.

The laser beam may perform conduction welding that can form a welding pool on a plate member through a non-focus part.

The laser beam may be irradiated such that the diameter of the laser beam ranges from 0.8 to 1.2 mm at a non-focus area.

The predetermined inclination angle may be set to one of values ranging from 10 to 20° with respect to a line perpendicular to the first plate and the second plates.

The regular pattern may have a zigzag shape with respect to a moving direction of the laser beam.

A method for joining different kinds of plates according to an exemplary embodiment may include disposing a second plate on a first plate of which a melting point thereof is lower than that of the second plate such that at least parts of them are overlapped with each other, regularly irradiating a pulse-type laser beam on the overlapped portion of the first plate and the second plate from an upper portion thereof at a predetermined inclination angle, and joining the first plate and the second plate through the laser beam irradiation.

The first plate may be made of aluminum and the second plate may be made of steel.

When the first plate and the second plate are joined, a welding pool of the second plate is charged in a key hole formed on the first plate between the first plate and the second plate by a pulse wave type of laser beam such that the first plate and the second plate are joined together.

The laser beam may perform conduction welding that can form a welding pool on a plate member through a non-focus part, and the laser beam may be irradiated such that the diameter of the laser beam ranges from 0.8 to 1.2 mm at a non-focus area.

The predetermined inclination angle may be set to one of values ranging from 10 to 20° with respect to a vertical line of the first plate and the second plate.

An exemplary embodiment of the present invention can join steel with aluminum through laser welding to improve reproducibility and quality of a melt bond.

Also, different kinds of plates that are welded through laser welding can be applied to a vehicle body, and thus components become light in weight, manufacturing cost can be reduced, and manufacturing efficiency can be improved.

In addition, effects that can be obtained or predicted from an exemplary embodiment of the present invention are directly or suggestively disclosed in the detailed description of an exemplary embodiment of the present invention. That is, a various effects that are predicted from an exemplary embodiment of the present invention can be disclosed in the following detailed description.

DETAILED DESCRIPTION OF THE EMBODIMENTS

The operation principle of a method for joining different kinds of plates according to an exemplary embodiment of the present invention will be described hereafter in detail with reference to the accompanying drawings. However, the drawings to be described below and the following detailed description relate to one preferred exemplary embodiment of various exemplary embodiments for effectively explaining the characteristics of the present invention. Therefore, the present invention should not be construed as being limited to the drawings and the following description.

Further, in the description of the present invention, the detailed description of related well-known configurations and functions is not provided, when it is determined as unnecessarily making the scope of the present invention unclear. Further, the terminologies to be described below are ones defined in consideration of their function in the present invention, and may be changed by the intention of a user or an operator, or a custom. Therefore, their definition should be determined on the basis of the description of the present invention.

Further, in the following exemplary embodiments, the terminologies are appropriately changed, combined, or divided so that those skilled in the art can clearly understand them, in order to efficiently explain the main technical characteristics of the present invention, but the present invention is not limited thereto.

Hereinafter, exemplary embodiments of the present invention will be described in detail with reference to the accompanying drawings.

Figure 1:
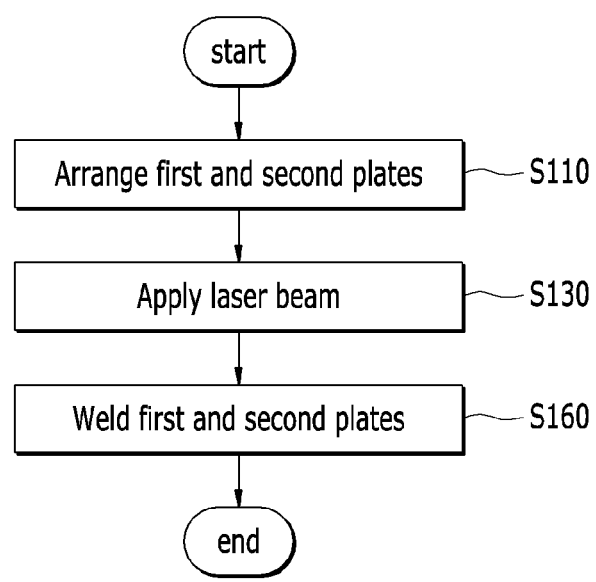
FIG. 1 is a flowchart showing a method for joining different kinds of plates according to an exemplary embodiment of the present invention.
Figure 2:
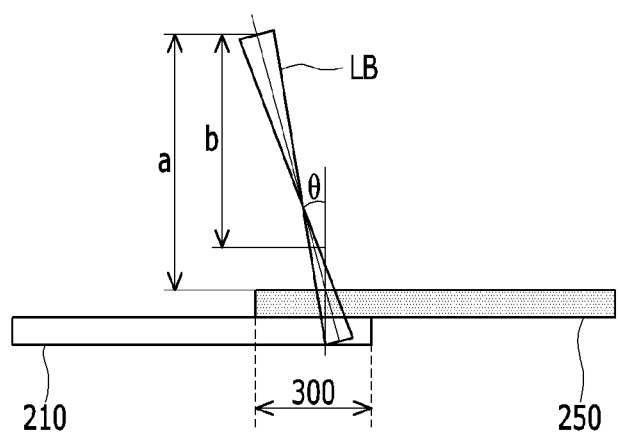
FIG. 2 is a diagram showing a method for joining different kinds of plates according to an exemplary embodiment of the present invention.
Figure 3:
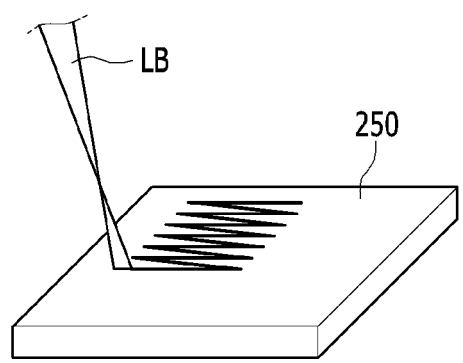
FIG. 3 is a diagram showing an irradiation pattern of a laser beam according to an exemplary embodiment of the present invention.
Figure 4:
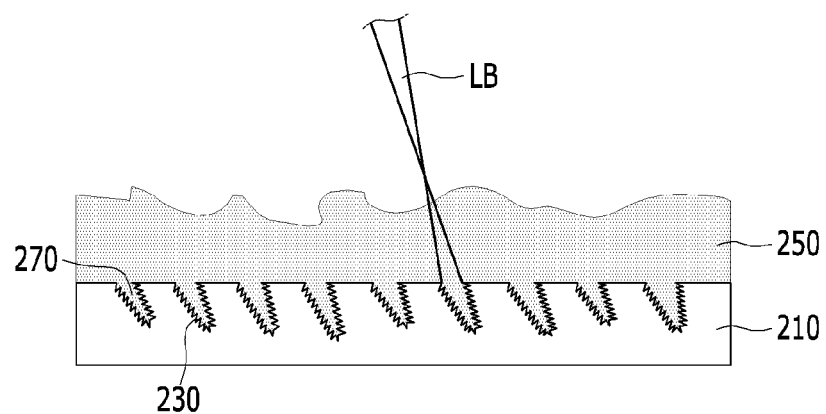
FIG. 4 is a diagram showing a joining condition of a first plate and a second plate according to an exemplary embodiment of the present invention.

FIG. 1 is a flowchart showing a method for joining different kinds of plates according to an exemplary embodiment of the present invention, FIG. 2 is a diagram showing a method for joining different kinds of plates according to an exemplary embodiment of the present invention, FIG. 3 is a diagram showing an irradiation pattern of a laser beam according to an exemplary embodiment of the present invention, and FIG. 4 is a diagram showing a joining condition of a first plate and a second plate according to an exemplary embodiment of the present invention.

Referring to FIG. 1 and FIG. 2, a first plate 210 and a second plate 250 of which materials thereof are different are prepared, and the first plate 210 and the second plate 250 are disposed to overlap in step S110. More specifically, the first plate 210 and the second plate 250 of different materials are prepared. A melting point of the first plate 210 and the second plate 250 can be different. That is, the second plate 250 can be made of material of which the melting point is higher than that of the first plate 210. For example, the first plate 210 is made of aluminum, and the second plate 250 can be made of steel of which the melting point is higher than that of the aluminum.

The first plate 210 is disposed at a lower side, the second plate 250 is disposed at an upper side, and they are partially overlapped with each other. That is, the first plate 210 and the second plate 250, as shown in FIG. 2, are overlapped to form an overlapped portion 300.

A laser beam (LB) is applied to the first plate 210 and the second plate 250 in step S130. In other words, a laser beam (LB) is applied to the overlapped portion with a slanted incident angle from an upper side of the first plate 210 and the second plate 250. T this time, the incident angle can be set to one value ranging from 10° to 20° based on a line perpendicular to the first plate 210 and the second plate 250. For example, the incident angle can be set to 15° based on a line perpendicular to the first plate 210 and the second plate 250.

The laser beam (LB) can be a beam for conduction welding that can form a welding pool on a plate with a non-focus area. The laser beam (LB), as shown in FIG. 2, can have one diameter value ranging from 0.8 mm to 1.2 mm at a non-focus area (a). That is, the laser beam (LB) can have a 1 mm diameter at a non-focus area (a). Further, a diameter of the laser beam (LB), as shown in FIG. 2, can be set to one value ranging from 0.4 to 0.8 mm at a focus area (b). That is, the laser beam (LB) can apply a 0.6 mm diameter beam at a focus area (b).

Also, the laser beam (LB) can be applied to the first plate 210 and the second plate 250 with a uniform pattern. Because the laser beam (LB) is applied to the first plate 210 and the second plate 250 with a uniform pulse, the laser beam is applied thereto with a uniform pattern. That is, the laser beam (LB) can be applied to the first plate 210 and the second plate 250, as shown in FIG. 4, with a zigzag pattern based on a moving direction of the laser beam (LB).

The first plate 210 and the second plate 250 are welded by the laser beam (LB) in step S160. More specifically, when a pulse-type laser beam (LB) is applied from an upper side of the first plate 210 and the second plate 250, as shown in FIG. 4, a key hole 230 is formed on the first plate 210 between the first plate 210 and the second plate 250, and a welding pool 270 of the second plate 250 is charged in the key hole 230 formed on the first plate 210. The first plate 210 and the second plate 250 are welded by the key hole 230 and the welding pool 270.

Accordingly, a method for joining different plates according to an exemplary embodiment of the present invention regularly applies the pulse-type laser beam onto the plates at a uniform slanted angle based on a line that is perpendicular to the plates such that plates made of different materials can be welded, welding quality can be secured, and investment cost can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

210: first plate
230: key hole
250: second plate
270: welding pool
300: overlapped portion
LB: laser beam

What is claimed is:
1. A method for joining different kinds of plates, comprising:

disposing a first plate and a second plate, materials thereof being different from each other, such that they are overlapped with each other; and joining the first plate and second plate by irradiating a laser beam at a predetermined inclination angle (θ) that is relative to a thickness direction line of the first plate and the second plate and in a predetermined pattern onto the overlapped portion of the two plates, wherein the first plate is made of aluminum and the second plate is disposed on the first plate and is made of steel of which a melting point is higher than that of the first plate, and a welding pool of the second plate is filled in a key hole formed on the first plate between the first plate and the second plate.

2. The method for joining different kinds of plates of claim 1, wherein the laser beam is outputted as a predetermined regular pulse wave.

3. The method for joining different kinds of plates of claim 1, wherein the laser beam performs conduction welding that can form a welding pool on a plate member.

4. The method for joining different kinds of plates of claim 3, wherein the laser beam is irradiated such that the diameter of the laser beam ranges from 0.8 to 1.2 mm.

5. The method for joining different kinds of plates of claim 1, wherein the predetermined inclination angle is set to one of values ranging from 10 to 20° with respect to a line perpendicular to the first plate and the second plate.

6. The method for joining different kinds of plates of claim 1, wherein the predetermined pattern has a zigzag shape with respect to a moving direction of the laser beam.

7. A method for joining different kinds of plates, comprising:

disposing a second plate on a first plate of which a melting point thereof is lower than that of the second plate such that at least parts of them are overlapped with each other;

regularly irradiating a pulse-type laser beam on the overlapped portion of the first plate and the second plate from an upper portion thereof at a predetermined inclination angle (θ) that is relative to a thickness direction line of the first plate 210 and the second plate 250; and joining the first plate and the second plate through the laser beam irradiation, wherein a welding pool of the second plate is filled in a key hole formed in the first plate between the first plate and the second plate by a pulse-type laser beam such that the first plate and the second plate are joined.

8. The method for joining different kinds of plates of claim 7, wherein the first plate is made of aluminum and the second plate is made of steel.

9. The method for joining different kinds of plates of claim 7, wherein the laser beam performs conduction welding that can form a welding pool on a plate member, and the laser beam is irradiated such that the diameter of the laser beam ranges from 0.8 to 1.2 mm.

10. The method for joining different kinds of plates of claim 7, wherein the predetermined inclination angle is set to one of values ranging from 10 to 20° with respect to a vertical line of the first plate and the second plate.

* * * * *